United States Patent [19]

Hill et al.

[11] 4,219,444

[45] Aug. 26, 1980

[54] ETHYLENE POLYMERIZATION CATALYSTS

[75] Inventors: Robert W. Hill, Houston, Tex.;
William L. Kehl, Pittsburgh, Pa.;
Thomas J. Lynch, Houston, Tex.

[73] Assignee: Gulf Oil Corporation, Pittsburgh, Pa.

[21] Appl. No.: 864,296

[22] Filed: Dec. 27, 1977

Related U.S. Application Data

[63] Continuation-in-part of Ser. No. 722,197, Sep. 10, 1976, abandoned, which is a continuation-in-part of Ser. No. 612,252, Sep. 10, 1975, abandoned.

[51] Int. Cl.$^2$ .................. B01J 27/14; B01J 31/12
[52] U.S. Cl. .................. 252/435; 252/437; 252/431 P
[58] Field of Search .................. 252/431 P, 435, 437, 252/612, 252

[56] References Cited

U.S. PATENT DOCUMENTS

| | | | |
|---|---|---|---|
| 2,930,789 | 3/1960 | Kerber et al. | 260/94.9 |
| 4,080,311 | 3/1978 | Kehl | 252/437 |

*Primary Examiner*—Delbert E. Gantz
*Assistant Examiner*—William G. Wright
*Attorney, Agent, or Firm*—Richard L. Kelly

[57] ABSTRACT

Novel catalysts are provided for the polymerization of olefins such as ethylene. The catalysts consist essentially of a chromium compound supported upon an inorganic carrier containing aluminum and phosphorus moieties, at least a portion of the chromium having a valence of less than 6. The inorganic carrier is an amorphous precipitate of aluminum phosphate or an amorphous precipitate containing aluminum and phosphorus moieties in an atomic ratio in the range of about 5:1 to 1:1. The catalysts are particularly useful for polymerizing ethylene in a Particle Form Process in that the catalyst has essentially no polymerization induction period and provides ethylene polymers having a desirably broad molecular weight distribution and a desirably high melt flow shear ratio.

14 Claims, 6 Drawing Figures

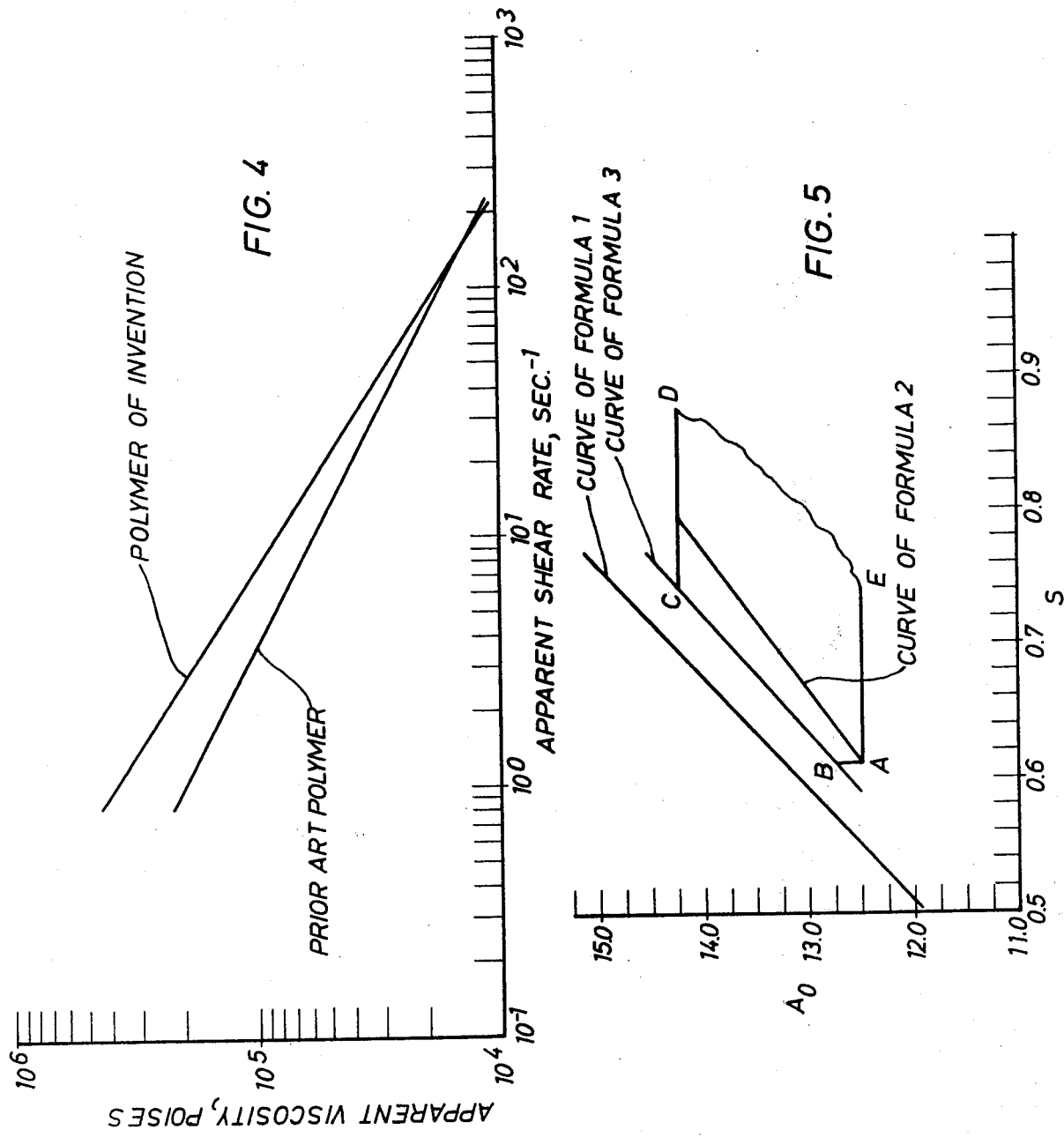

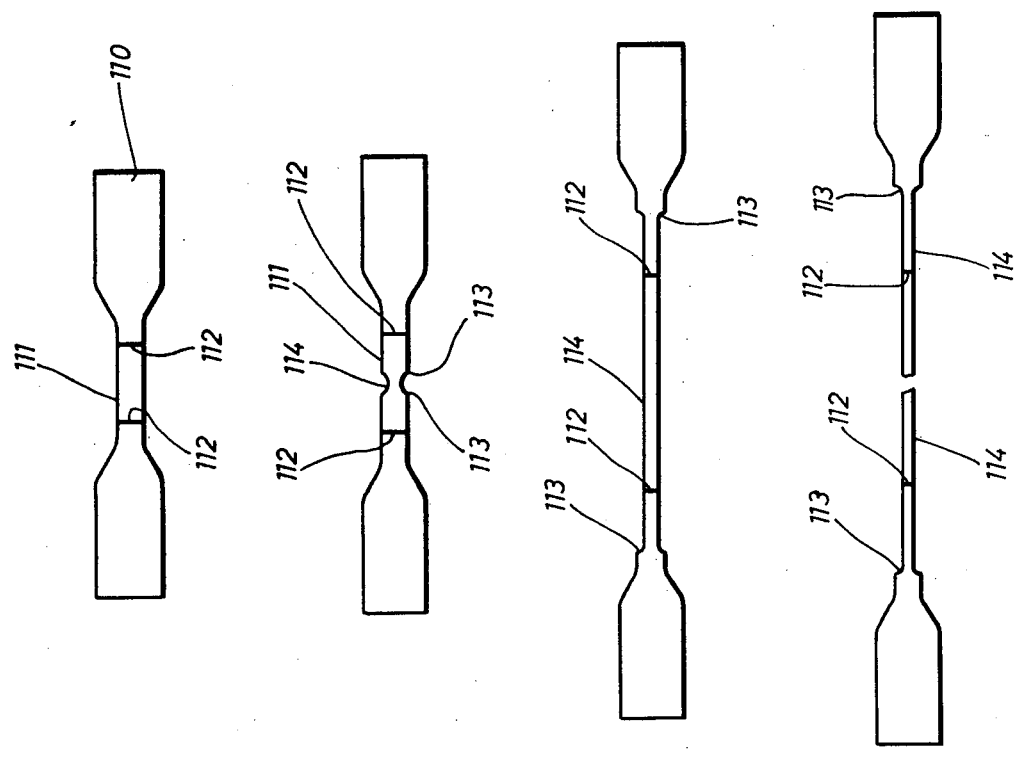
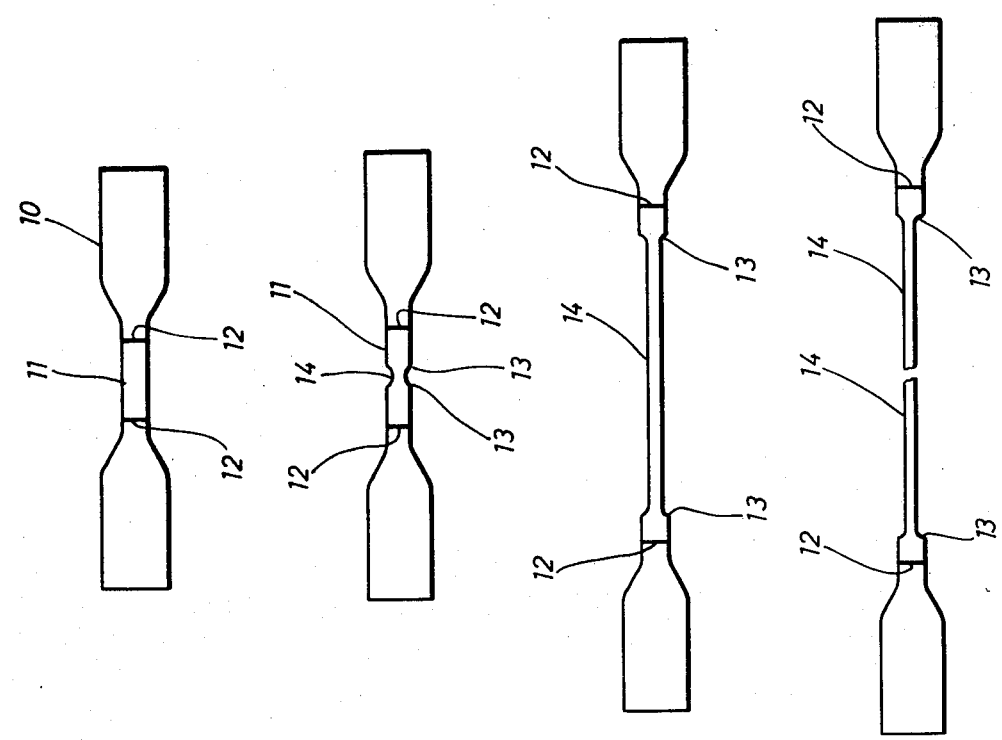
FIG.6

ETHYLENE POLYMERIZATION CATALYSTS

CROSS REFERENCE TO RELATED APPLICATION

This application is a continuation-in-part of our earlier application, Ser. No. 722,197, filed on Sept. 10, 1976, now abandoned, which in turn is a continuation-in-part of our earlier application, Ser. No. 612,252, filed on Sept. 10, 1975, now abandoned.

BACKGROUND OF THE INVENTION

One of the principal commercial processes employed to manufacture high density linear ethylene polymers is to polymerize ethylene in the presence of a chromium oxide catalyst supported on silica. While the catalysts employed in this process are characterized as being a chromium oxide supported on silica, it is believed that the chromium undergoes at least partial reaction with silicon atoms to form complex molecules whose precise chemical composition has not been established with certainty. It is believed that at least a portion of the chromium is present in the hexavalent state.

In a specific aspect of this process, the polymerization is carried out in a liquid hydrocarbon medium having little or no solvent action on the resin being produced, and the resin, as formed, precipitates as fine solid particles. For this reason, this particular process is known in the art as the Particle Form Process. As used throughout this specification, the term Particle Form Process will be restricted to a process carried out in the presence of a chromium catalyst and carried out in a liquid hydrocarbon medium having solubility characteristics such that the resin, as produced, precipitates in the form of fine solid particles.

One of the limitations of the Particle Form Process is that the resins produced by the process have a relatively narrow molecular weight distribution and a relatively low melt flow shear ratio which conventionally is expressed as the ratio obtained by dividing the high load melt index (ASTM 1238-70, Condition F) by the normal load melt index (ASTM 1238-70, Condition E. For a number of industrial purposes, it is desirable to have available high density linear ethylene polymers having broad molecular weight distributions and high melt flow shear ratios.

Many workers have attempted to modify the Particle Form Process to expand its capability to manufacture ethylene polymers having broader molecular weight distributions and higher melt flow shear ratios. Such efforts have been directed principally to modifying the chromium oxide-supported catalysts employed in the process. The success of such efforts has been marginal, at best, and many workers in the art believe that the Particle Form Process inherently is restricted to the manufacture of ethylene polymers having narrow molecular weight distributions and low melt flow shear ratios.

SUMMARY OF THE INVENTION

In accordance with the present invention, the applicants have discovered a novel class of catalysts useful in the polymerization of olefins such as ethylene. The catalysts are prepared by depositing a chromium compound upon an inorganic carrier containing aluminum and phosphorus moieties and activating the catalyst by heating the material to a temperature of at least about 350° C. Such carriers are prepared by neutralizing an aqueous solution containing $Al^{+++}$ cations and $PO_4^{---}$ anions in a molar ratio in the range of about 5:1 to 1:1 to form a solid precipitate containing aluminum and phosphorus moieties.

These catalysts, when employed to initiate the polymerization of ethylene in the Particle Form Process, have no observable induction period and provide ethylene polymers of significantly broader molecular weight distributions and significantly higher melt flow shear ratios than are obtained in the Particle Form Process with prior art catalysts.

BRIEF DESCRIPTION OF THE DRAWINGS

FIG. 4 is a plot of the rheological data of an ethylene polymer prepared with a catalyst of the invention and an ethylene polymer prepared with a prior art catalyst.

FIG. 5 is a plot of certain parameters of the melt flow properties of ethylene polymers of the invention and prior art ethylene polymers.

FIG. 6 is a drawing illustrating the manner in which "dog bones" of ethylene polymers of the invention and ethylene polymers of the prior art deform when drawn to the breaking point to measure elongation at break.

DETAILED DESCRIPTION OF THE INVENTION

Figure 1:
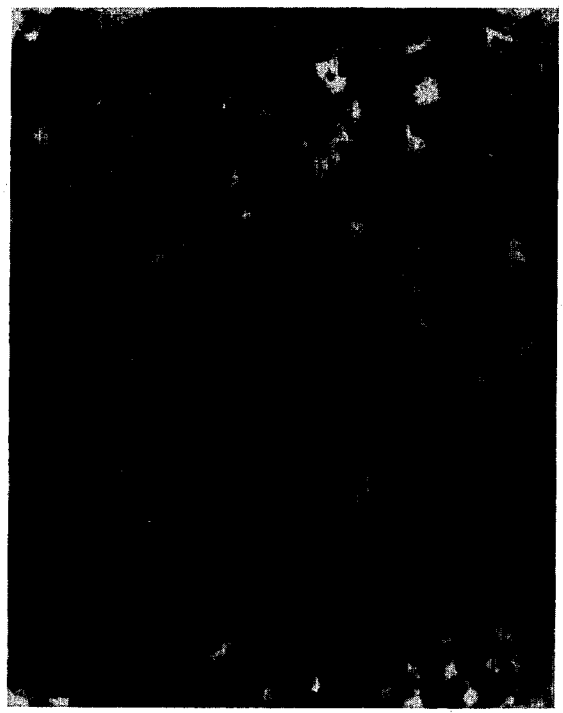
FIG. 1 is a photomicrograph (at 50,000 diameters) of the calcined amorphous aluminum phosphate precipitate prepared in Example 1.

In accordance with the present invention, the applicants provide their novel polymerization catalysts by depositing a chromium compound on a particular type of carrier or support and activating the catalyst by heating to a temperature of at least about 350° C. For reasons which will be developed, the catalysts of the invention differ significantly from the supported chromium oxide polymerization catalysts of the prior art, both with respect to chemical structure and catalytic activity.

The catalysts, when prepared in accordance with the preferred methods hereinafter described, contain a substantial portion of their chromium content in an oxidation state of less than 6. This is evidenced by the fact that the preferred catalysts have a green color as distinguished from the brown to orange color of hexavalent chromium compounds. This is true even if the chromium compound employed in the catalyst preparation is in the hexavalent state. It is known that $CrO_3$, when heated to about 250° C., will generally be converted to $Cr_2O_3$ and liberate oxygen. As will be subsequently demonstrated, the catalysts of the invention, when employed in the Particle Form Process, have no observable polymerization induction period.

The carriers or supports for the catalysts of the invention may be of two related types. The first type is an amorphous precipitate of aluminum phosphate. The second type is an amorphous precipitate containing aluminum and phosphorus moieties in an atomic ratio in the range of about 5:1 to 1:1, preferably in the range of about 3.5:1 to 1.2:1 and more especially in the range of about 3.0:1 to 1.5:1.

The amorphous precipitates of aluminum phosphate used in the invention can be prepared by neutralization of a strongly acidic aqueous medium containing aluminum cations and $PO_4^{---}$ anions in a substantially equal molar ratio. Such acidic solutions are prepared by dissolving in water a highly soluble aluminum salt and a source of $PO_4^{---}$ ions, usually ortho-phosphoric acid. The aluminum salt employed is not critical, provided only that it does not contain an anion which will form a precipitate in the subsequent precipitation step. Aluminum nitrate and aluminum halides, particularly aluminum chloride, are the aluminum salts of choice for use in the invention. While certain phosphate salts such as triammonium ortho-phosphate can be used as the source of the $PO_4^{---}$ ions, ortho-phosphoric acid is the source of choice for providing the $PO_4^{---}$ ions.

The amorphous aluminum phosphate precipitate is prepared by neutralizing the acidic medium containing aluminum cations and phosphate anions. When the pH is increased to 2 or higher, the aluminum phosphorus moieties precipitate from the aqueous medium. While in theory the neutralization can be carried out by mixing the acidic solution with an appropriate alkali in any manner, it is preferred to simultaneously add the acidic medium and the neutralizing alkali to a stirred aqueous medium. The two solutions should be added at controlled rates so that the pH is continuously maintained at a preselected pH in the range of about 4.0–11.0 and preferably about 6.0–10.0. While a wide variety of bases can be used to neutralize the acidic medium, it is preferred to use ammonium hydroxide or an ammonium salt such as ammonium carbonate so that the aluminum-phosphorus precipitate will be free of metallic ions that might be incorporated into the precipitate, if inorganic bases such as sodium carbonate or sodium hydroxide were used in the process. While the precipitation reaction can be carried out over a wide range of temperatures, ambient temperature usually is employed, as no significant advantages are obtained by heating or cooling.

After the precipitation is completed, the precipitate is filtered, washed one or more times to free the precipitate of occluded ions, and dried. The precipitate preferably is spray dried. This technique makes it possible to prepare the support in the most desired particle size range of the order of about 50–150 microns. In addition, the finished catalyst prepared from the spray-dried material tends to have a higher level of catalytic activity. After drying, the precipitate is optionally calcined in a conventional manner at a suitable temperature, typically in a range of about 125°–500° C. No advantages are obtained by calcining at higher temperatures and it is preferred to avoid calcining the product at temperatures above about 1100° C., as some crystallization takes place at these higher temperatures. A product calcined for 4 hours at 1100° C. appeared to be crystalline and to have a rudimentary tridymite-type structure.

The calcined aluminum phosphate product is amorphous, and usually has a bulk density in the range of about 0.25 to 0.5 grams/cm$^3$, and has the appearance of a compacted mass of spherical granules having a diameter in the 1–5 micron range.

The second type of carrier for the catalysts of the invention consists of amorphous precipitates containing aluminum and phosphorus moieties in which the aluminum and phosphorus are present in an atomic ratio within the range previously described. While it is possible to prepare precipitates having an aluminum/phosphorus atomic ratio of greater than about 5:1, the ultimate chromium containing catalysts prepared therefrom give polymerization rates lower than desired in commercial practice.

The aluminum-phosphorus containing precipitates are prepared by the same procedures employed to prepare the aluminum phosphate precipitates, except that the molar ratio of aluminum cations to $PO_4^{---}$ anions is adjusted to a range from about 5:1 to substantially 1:1, preferably to a range from about 3.5:1 to about 1.2:1 and more especially to a range of about 3.0:1 to 1.5:1.

Figure 2:
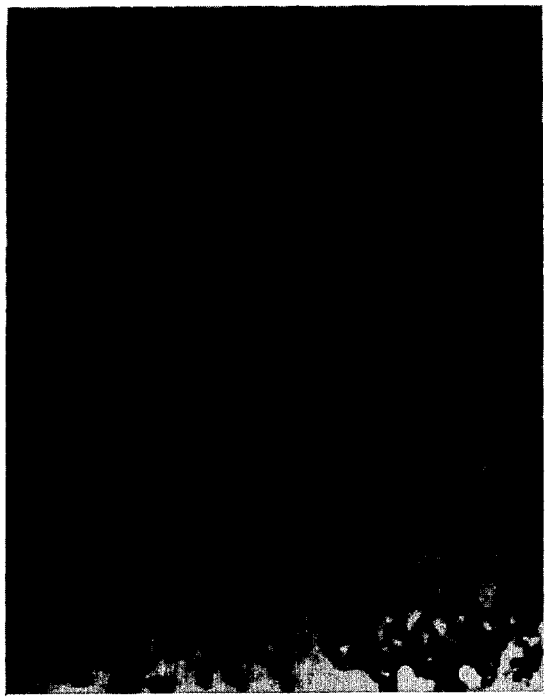
FIG. 2 is a photomicrograph (at 50,000 diameters) of the calcined amorphous aluminum-phosphorus containing precipitate prepared in Example 2 and which has an aluminum-phosphorus atomic ratio of 2:1.

In physical appearance and gross physical properties, the calcined amorphous aluminum-phosphorus containing precipitates are virtually indistinguishable from the calcined amorphous aluminum phosphate precipitates previously described. The similarity of the physical appearance of the two types of calcined amorphous precipitates is seen by an examination of FIGS. 1 and 2. FIG. 1 is a photomicrograph (at 50,000 diameters) of the calcined amorphous aluminum phosphate precipitate prepared in Example 1. FIG. 2 is a photomicrograph (at 50,000 diameters) of the calcined amorphous aluminum-phosphorus containing precipitate prepared in Example 2 which has an aluminum-phosphorus atomic ratio of 2:1.

Figure 3:
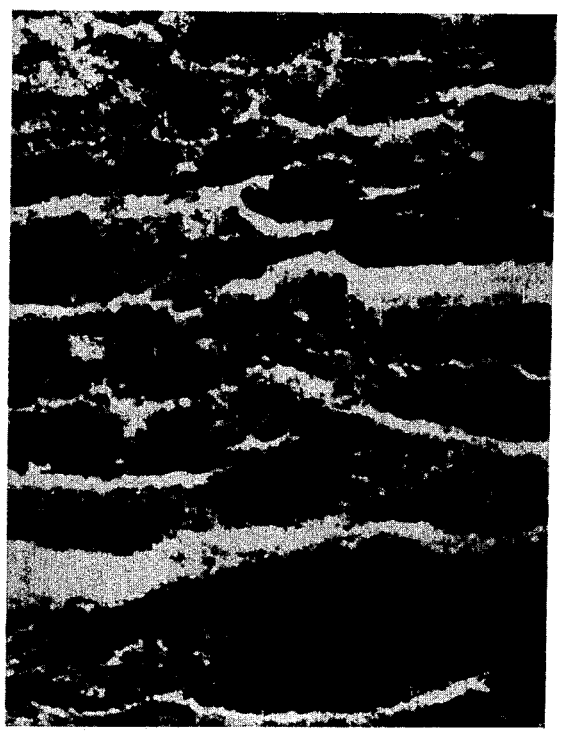
FIG. 3 is a photomicrograph (at 50,000 diameters) of the calcined $Al_2O_3$ precipitate prepared in Example 3.

The calcined amorphous aluminum-phosphorus containing precipitates—over the entire range of aluminum phosphorus atomic ratios operable in the present invention—show none of the characteristics of calcined $Al_2O_3$ precipitates. This fact is established by an examination of FIGS. 2 and 3. FIG. 2 has been previously described and FIG. 3 is a photomicrograph (at 50,000 diameters) of the calcined $Al_2O_3$ precipitate prepared in Example 3.

X-ray diffraction data also show that calcined precipitated aluminum-phosphorus precipitates prepared in accord with the preferred methods set forth herein do not have any of the characteristics of calcined $Al_2O_3$ precipitates. Two lots of (1) the aluminum phosphate precipitate of Example 1, (2) the $Al_2O_3$ precipitate of Example 3, and (3) an aluminum-phosphorus precipitate having the aluminum and phosphorus moieties present in a 4:1 atomic ratio were calcined for, respectively, 16 hours at 900° C. and 16 hours at 1100° C. The X-ray diffraction patterns indicated that the $Al_2O_3$ calcined at 900° C. was a mixture of the gamma and alpha crystalline structure, whereas the $Al_2O_3$ calcined at 1100° C. was entirely in the alpha crystalline structure. The X-ray diffraction patterns of the other two samples that were calcined at 900° C. showed no evidence of any type of crystalline structure. The X-ray diffraction pattern of the product of Example 1 that was calcined at 1100° C. showed evidence of a rudimentary tridymite-type crystalline structure, which was quite different from the pattern of the $Al_2O_3$ product. The X-ray diffraction pattern of the aluminum-phosphorus precipitate (4:1 Al/P ratio) calcined at 1100° C. showed evidence of partial crystallization. The pattern was consistent with (1) an incompletely crystallized tridymite type structure (typical of certain crystalline $AlPO_4$ structures) and (2) a theta type $Al_2O_3$ crystalline structure.

While all of the aluminum phosphate precipitates prepared as described above are amorphous and can be used in the practice of the invention, certain differences do exist, depending principally upon the pH prevailing during the precipitation reaction. When the precipitation is carried out at a pH of less than 3.0, the IR spectrum of the precipitate shows no bands characteristic of an aluminum hydroxyl group. By contrast, when the precipitation is carried out at a pH of 3.0 or higher, the IR spectrum of the precipitate shows bands characteristic of an aluminum hydroxyl group. The precipitates prepared at a pH of 3.0 or higher, do not undergo any crystallization until heated to about 1100° C. The precipitates prepared at a pH of less than 3.0, when heated to 500° C. for a sufficient period of time, will crystallize and exhibit an X-ray diffraction pattern characteristic of the literature-reported diffraction pattern of aluminum orthophosphate. For these reasons, it is desirable to prepare the aluminum phosphate precipitates at a pH of 3.0 or higher.

As certain aluminum salts, ortho-phosphoric acid and ammonium hydroxide are soluble in certain polar solvents such as methanol, it is possible to prepare the previously described inorganic carriers by carrying out the indicated synthesis steps in such polar solvents or in mixtures of water and such polar solvents.

The catalysts of the invention are prepared by depositing a chromium compound on a carrier or support of the type previously described. The concentration of the chromium compound deposited upon the carrier is not critical, but ordinarily will be in the range of about 0.1–4.0% and preferably in the range of about 0.2–3.0% and more especially about 1.5–2.5%, expressed as free chromium. Thereafter, the catalysts are activated by being heated as subsequently described.

The chromium may be deposited on the carrier in almost any chemical form such as chromic anhydride or a salt such as chromium chloride, chromium nitrate, chromium acetate, and the like. Upon being heated in the activation step, the chromium is probably converted to a different chemical form. The precise chemical form in which the chromium exists after activation is not known with certainty, but it may exist as an oxide or a phosphate or may be incorporated into the structure of the support.

In one embodiment of the invention, the catalysts are prepared by depositing chromic anhydride on the carrier. This can be done by simply admixing appropriate quantities of chromic anhydride and the carrier and tumbling the materials together in a suitable vessel at an elevated temperature under reduced pressure. Under these conditions, the chromium deposits itself substantially uniformly over the entire surface of the carrier.

In another embodiment of the invention, the chromic anhydride or a water soluble chromium salt in an appropriate quantity may be admixed with the aqueous slurry of the carrier as it is prepared. Thereafter the slurry may be dried in any desired manner. One of the preferred methods for preparing the catalysts is to add the chromium compound to the aqueous slurry of the carrier and to then spray dry the slurry. This spray drying technique has the advantage that the catalyst is recovered with a particle size distribution that is convenient for use in the polymerization of ethylene. Typically, the catalyst prepared by the spray drying technique will have particle sizes in the range of about 50–150 microns. Particles outside of this desired range can be removed by screening, but proper spray drying techniques can largely eliminate any need for screening.

The catalysts prepared as described above will be activated by being heated to an elevated temperature in the range of about 350°–950° C. and preferably in the range of about 500°–925° C. The activation is conveniently carried out by the same techniques employed to activate the prior art catalysts previously described, as by being suspended and fluidized in a stream of heated oxygen containing gas.

In yet another embodiment of the invention, a water-soluble chromium compound will be incorporated into the acidic solution employed to prepare the aluminum-phosphorus containing carrier. The precipitation of the aluminum and phosphorus moieties also precipitates the chromium compound which becomes intimately admixed with the aluminum and phosphorus moieties. When this carrier is heated to the activation temperatures previously described, highly active catalysts are obtained.

As earlier noted herein, the preferred catalysts of the invention have a substantial portion of the chromium compound in a valence state of less than 6. This presents no problems so long as appropriate control of temperature is maintained in activating the catalysts. At temperatures above about 250° C. any hexavalent chromium oxides present decompose with the liberation of oxygen. When activation temperatures above about 950° C. are employed, however, for reasons which are not fully understood, the polymerization activity of the catalyst declines.

In another embodiment of the invention, organochromium compounds can be deposited upon the supports of the type previously described. Examples of suitable organochromium compounds include dicyclopentadienyl chromium (II) and triphenylsilyl chromate. Other organochromium compounds that can be employed are those disclosed in the following issued U.S. patents:

| | |
|---|---|
| 3,157,712 | 3,709,954 |
| 3,324,095 | 3,756,998 |
| 3,324,101 | 3,757,002 |
| 3,687,920 | 3,806,500 |
| 3,709,853 | |

Such chromium compounds are dissolved in an appropriate solvent which then is used to impregnate the support, after which the solvent is removed by evaporation. With catalysts of this type, it is not necessary to heat activate the finished catalyst. The support will be calcined to temperatures within the range previously discussed before the organochromium compound is deposited thereon.

While the polymerization catalysts of this invention are employed in the conventional manner in the polymerization of ethylene, unexpected benefits are obtained by use of the catalysts of the invention. Specifically, when the catalysts of the invention are employed in the polymerization of the ethylene by the Particle Form Process, no observable induction period is encountered. By contrast, the prior art catalysts in which chromic anhydride is deposited on silica have a substantial induction period. Moreover, the ethylene polymers produced by the use of the catalysts of the invention in the Particle Form Process provide ethylene polymers having desirably broad molecular weight distributions and desirably high melt flow shear ratios.

In carrying out the Particle Form Process with the catalysts of the invention, the process can be controlled and/or modified by techniques similar to those used with other catalysts in the Particle Form Process. By way of example, increasing the temperature of polymerization, other conditions being held constant, lowers the molecular weight of the polymer being produced. Similarly, the inclusion of hydrogen in the reaction zone lowers the molecular weight of the polymer being produced. The inclusion of higher mono alpha-olefins such as propylene, hexene and the like in the reaction zone produces copolymers having lower densities than the ethylene homopolymers otherwise produced under the prevailing polymerization conditions.

The catalysts of the invention also can be employed to polymerize ethylene in a vapor phase, fluidized bed process. The ethylene polymers produced by such processes have desirably broad molecular weight distributions and desirably high melt flow shear ratios similar to those of the ethylene polymers produced by a Particle Form Process.

The following examples are set forth to illustrate more clearly the principle and practice of this invention to those skilled in the art. Where references are made to percentages and parts, such percentages and parts are expressed on a weight basis unless otherwise indicated.

EXAMPLE 1

This example will illustrate the preparation of a calcined amorphous aluminum phosphate precipitate.

A strongly acidic solution containing aluminum cations and ortho-phosphate anions in an equal molar ratio was prepared by dissolving 242 grams (1 mol) of aluminum chloride ($AlCl_3.6H_2O$) in 1 liter of distilled water and then adding 117 grams (1 mol) of an 85% solution of ortho-phosphoric acid. Water was added to bring the volume of this solution up to 3 liters. A second solution was prepared by diluting 300 ml of concentrated 28% ammonium hydroxide with 300 ml of distilled water. This solution contained approximately 2.4 mols of ammonium hydroxide.

A stirred reaction vessel was charged with 1000 ml of distilled water. To this distilled water was added the previously described acidic solution at a rate of approximately 100 ml per minute. The ammonium hydroxide solution was added simultaneously at a rate sufficient to maintain the pH of the stirred reaction mixture at a constant value of 8.0. After the addition of the acidic solution was completed, the reaction mixture was stirred for an additional half hour. A total of 580 ml of the ammonium hydroxide solution was used. The precipitated aluminum phosphate then was filtered, washed with 3000 ml of distilled water and dried overnight at 120° C. The oven-dried granular material was calcined in air at 500° C. in a muffle furnace.

EXAMPLE 2

This example will illustrate the preparation of a calcined amorphous aluminum-phosphorus containing precipitate having an aluminum-phosphorus atomic ratio of 2:1. The precipitate was made in the identical manner set forth in Example 1, except that the acidic solution was prepared by dissolving 750 grams (2 mols) of aluminum nitrate ($Al(NO_3)_3.9H_2O$) in the 5 liters of distilled water before adding the 117 grams (1 mol) of 85% ortho-phosphoric acid thereto.

EXAMPLE 3

This example will illustrate the preparation of a calcined precipitate of $Al_2O_3$, which precipitate was prepared as a control to illustrate certain differences in the physical properties of calcined aluminum-phosphorus precipitates as compared with calcined $Al_2O_3$ precipitates. The $Al_2O_3$ precipitate was prepared in exactly the same manner as set forth in Example 1, except that no phosphoric acid was added to the acidic aqueous solution of aluminum chloride.

EXAMPLE 4-7

Calcined amorphous precipitates containing the aluminum and phosphorus moieties in varying atomic ratios were prepared in the same manner as described in Example 2 except that the quantities of the aluminum nitrate and the ortho-phosphoric acid were varied to give the desired aluminum-phosphorus atomic ratios. The ratios employed are set forth below:

| Example No. | Al-P Atomic Ratio |
| --- | --- |
| 4 | 1.5:1 |
| 5 | 3:1 |
| 6 | 4:1 |
| 7 | 9:1 |

EXAMPLE 8

An acidic solution was prepared by dissolving 1000 g of $Al(NO_3)_3.9H_2O$ (2.67 mols) in 7 liters of distilled water. To this solution was added 153 g of $H_3PO_4$ (85%), (1.33 mols) with thorough mixing. A stock solution of $NH_4OH$ was prepared by mixing 1 liter of $NH_4OH$ (28%) with 2 liters of distilled water. This $NH_4OH$ solution was added slowly, with vigorous stirring, to the acidic solution until the pH of the acidic solution reached 8.0. A precipitate was formed during the addition of the $NH_4OH$ solution. After the pH of 8.0 was reached, stirring was continued for 10 minutes and the slurry was then allowed to stand for 2 hours. The precipitate was separated from the liquid by filtration and was washed on the filter with 10 liters of distilled water. The moist filter cake was stored in a sealed plastic container until ready for the addition of chromium.

EXAMPLE 9

An acidic solution was prepared by dissolving 100 g of $Al(NO_3)_3.9H_2O$ (0.27 mol) in 2 liters of distilled water. To this solution was added 31 g of $H_3PO_4$ (85%) (0.27 mol) with stirring. A stock solution of ammonium carbonate was prepared by dissolving 119 g of $NH_4HCO_3$ in 1000 ml of distilled water and $NH_4OH$ was added to adjust the pH of this solution to 10.7. A reaction vessel was charged with 1000 ml of distilled water to provide a stirring medium. The acidic solution was added to this reaction vessel at a rate of approximately 15 cc per minute with vigorous stirring, and the ammonium carbonate solution was added simultaneously at a rate to maintain a pH of 10 in the reaction vessel. After all of the acidic solution was added, stirring was continued for 10 minutes, followed by filtration. The filter cake was washed on the filter with 3000 ml of distilled water and the moist filter cake was stored in a sealed container until ready for the addition of chromium.

EXAMPLE 10

Example 9 was duplicated except for two modifications. First, aluminum chloride was employed in lieu of aluminum nitrate. Second, the aluminum chloride and phosphoric acid were employed in a ratio to provide an Al:P atomic ratio of 1.2:1.

EXAMPLE 11

An acidic solution was prepared by dissolving 10,000 g $Al(NO_3)_3 \cdot 9H_2O$ (26.7 mols) in 50 liters of distilled water. To this was added 1555 g $H_3PO_4$ (13.3 mols) with stirring. A stock solution of $NH_4OH$ was prepared by diluting ammonium hydroxide (28%) with an equal volume of water and mixing. A reaction vessel was charged with 10 liters of distilled water to provide a stirring medium, and the acidic solution was added to this at a rate of approximately 500 ml per minute, with vigorous stirring. The ammonium hydroxide solution was added simultaneously at a rate sufficient to maintain a pH of 8.0. After all of the acidic solution was added, stirring was continued for 10 minutes, after which the slurry was filtered. The filter cake was washed on the filter with 120 liters of distilled water. The moist filter cake, when removed from the filter, had a solids content of 12% by weight.

The above procedure was repeated, and the two moist filter cakes were combined in a mixing vessel and reslurried with a quantity of distilled water sufficient to reduce the solids content to 9 wt. %. This slurry was spray dried and the product was collected in two fractions, a coarse fraction which remained in the collector at the bottom of the spray dryer and the fines which were carried overhead to a second collector. The total yield of product was 5117 g.

EXAMPLE 12

7500 g (20 mols) of $Al(NO_3)_3 \cdot 9H_2O$ was dissolved in 50 liters of $H_2O$. To this solution was added 1150 g of 85% $H_3PO_4$ (10 mols) with stirring. A stock solution of $NH_4OH$ was prepared by mixing 3 liters of concentrated 28% ammonium hydroxide with 3 liters of distilled water.

A stirred reaction vessel was charged with 10 liters of distilled water. To this distilled water was added the acidic solution of aluminum nitrate and phosphoric acid at a rate of approximately 500 ml per minute. The ammonium hydroxide solution was added simultaneously at a rate sufficient to maintain the pH at 8. The reaction zone was stirred vigorously to maintain good mixing of the solutions. After the addition of the acidic solution was completed, the reaction mixture was stirred for 10 minutes. The precipitated aluminum phosphate then was filtered and washed with 100 liters of water. The filter cake as removed from the filter contained 8.4 weight % solids.

A chromic acid solution was prepared by dissolving 40 g of $CrO_3$ in 300 cc water. This solution was mixed thoroughly with the above wet filter cake until a homogeneous slurry was obtained. The chromium content corresponds to approximately 1,2 wt % Cr based on the solids content. This homogeneous slurry was dried in a spray dryer and the dried product yield was 1469 g of powder.

Examples 1, 2 and 4–11 above illustrate the preparation of the aluminum-phosphorus supports for the catalysts of the invention. The catalysts of the invention are prepared by impregnating such supports with an appropriate chromium compound and activating the catalyst by heat.

One method of preparing the catalyst is to first calcine the support, impregnate the support with chromic anhydride, and then activate the catalyst by fluidizing the catalyst in a stream of heated dry air. A typical procedure is illustrated in Example 13 below.

EXAMPLE 13

A 1-liter round bottom flask was charged with 2 parts of chromium anhydride and 98 parts of the calcined amorphous aluminum phosphate prepared in Example 1. The charged round bottom flask then was attached to a Buchi Rotavapor. The pressure within the Rotovapor apparatus was reduced to 12 kilopascals (approximately 0.12 atmosphere) and the temperature was raised to 70° C. and maintained at this temperature for 1 hour. The temperature then was raised to 120° C. At the end of the second hour, the pressure was lowered to 8 kilopascals (approximately 0.08 atmosphere) and the temperature was increased to 170° C. At the end of the third hour, the temperature was increased to 180° C. At the end of the fourth hour, the pressure was lowered to 0.4 kilopascal (approximately 0.004 atmosphere) and the temperature was raised to 205° C. Heating was continued for an additional three hours under these conditions. The catalyst then was cooled to ambient temperature and air was bled into the Rotavapor apparatus to bring the pressure back to atmospheric pressure. The orange-brown product then was transferred to a fluidized bed apparatus for activation.

The catalyst was activated by being heated to 760° C. for a period of 5 hours while maintaining the catalyst in a fluidized condition by the passage of air through the fluidized bed. The air used for this purpose had been treated so that it had a dew point of less than −50° C. The finished catalyst was green in color. The color indicated that the valence state of the chromium has been reduced to less than 6.

Another method of preparing the catalysts of the invention is to impregnate the carrier with the chromium compound before the carrier is dried. This procedure is illustrated in Example 12 above. The chromium impregnated carrier must be dried before being activated. The drying may be carried out in any manner as by simply heating in an oven, removing the residual water by mixing with an azeotroping solvent such as ethanol and distilling off the water as an azeotrope, or, preferably, by spray drying. The catalyst is activated as previously described.

The catalysts of the invention was evaluated in a standardized Particle Form Process that was run on a batch basis. In this standardized method a stirred polymerization reaction vessel was maintained in a heated jacket maintained at a temperature of about 110° C. The polymerization vessel was charged with the catalyst to be evaluated. A small quantity of dry, oxygen-free isobutane then was charged to the reactor, allowed to vaporize, and vented from the reactor to remove all traces of oxygen from the reactor. The reactor then was charged with 500 parts of isobutane and attached to a reservoir of polymerization grade ethylene gas maintained at a pressure of 3.5 megapascals (approximately 35 atmospheres). The reactor was in continuous open communication with the reservoir of ethylene gas with a flow meter being maintained in the ethylene line to measure the flow of gas to the reactor. During the charging period, the temperature of the vessel fell below 110° C., but normally the temperature was reestablished at about 110° C. within a few minutes after the isobutane was charged to the reactor.

With the catalysts of the invention, polymerization started almost immediately with no observable induction period.* Each polymerization was run for 90 minutes and the flow meter was read at 10 minute intervals to determine if there was any change in the rage of polymerization with time over the 90 minute period of the polymerization. At the end of the 90 minute period, the flow of the ethylene gas was discontinued, the reactor was vented, and the polyethylene was recovered and weighed.

*-With a commercial grade chromia catalyst supported on silica, induction periods of up to 50 minutes are frequently observed.

EXAMPLE 14

A series of four catalysts were prepared from the aluminum-phosphorus carrier described in Example 11. The carrier was calcined for 5 hours at 450° C. in a muffle furnace with a slow stream of dry air (dew point less than − 50° C.) being passed through the furnace. Chromic anhydride in an amount equivalent to 1% or 2% elemental chromium was deposited on the carrier by the technique described in Example 13. The catalysts were activated in a fluidized bed at a temperature of 540° C. or 760° C. for a period of 5 or 14 hours. Details of the catalyst preparations and the polymerization results are set forth in Table I.

TABLE I

| Run Identification | Catalyst Preparation | | | Polymerization Results | |
|---|---|---|---|---|---|
| | % Chromium | Activation Temp °C. | Activation Time, hours | Grams of Polymer | Polymer Rate(1) |
| A | 1 | 540 | 5 | 468 | 312 |
| B | 1 | 760 | 5 | 492 | 328 |
| C | 1 | 760 | 14 | 688 | 459 |
| D | 2 | 760 | 14 | 518 | 345 |

(1)Grams of polymer/gram of catalyst/hour.

Each of the catalysts gave good rates of polymerization and there was no induction period. The rate of polymerization was constant throughout each of the runs.

EXAMPLE 15

Example 14 was repeated employing two levels of chromium with the aluminum-phosphorus carrier being calcined at 750° C. Details of the catalyst preparations and the polymerization data are set forth in Table II.

Table II

| Run Identification | Catalyst Preparation | | | Polymerization Results | |
|---|---|---|---|---|---|
| | % Chromium | Activation Temp °C. | Activation Time, hours | Grams of Polymer. | Polymer. Rate(1) |
| A | 0.2 | 760 | 14 | 520 | 347 |
| B | 1.0 | 760 | 5 | 681 | 454 |

(1)Grams of polymer/gram of catalyst/hour.

Again it will be noted that good rates of polymerization were obtained.

EXAMPLE 16

The chromium containing spray dried catalyst of Example 12 was calcined for 5 hours at 500° C. in a muffle furnace in the presence of dry air having a dew point of less than −50° C. The calcined product was divided into several aliquots which were activated in a fluidized bed with dry air for varying time periods at varying activation temperatures.

The details of the catalyst preparations and the polymerization data are shown in Table III.

Table III

| Run Identification | Catalyst Preparation | | Polymerization Results | |
|---|---|---|---|---|
| | Activation Temp. °C. | Activation Time, hours | Grams of Polymer | Polymerization Rate(1) |
| A | 375 | 5 | 410 | 273 |
| B | 540 | 5 | 602 | 401 |
| C | 760 | 5 | 752 | 501 |
| D | 825 | 5 | 682 | 454 |
| E | 875 | 5 | 602 | 401 |
| F | 760 | 14 | 1014 | 676 |

(1)Grams of polymer/gram of catalyst/hour.

EXAMPLE 17

Part A

An aluminum phosphate support was prepared in a manner analagous to that set forth in Example I except that aluminum nitrate was employed as the source of aluminum ions and the precipitation was carried out at a pH of 10.0. The recovered precipitate was dried in an oven for 16 hours at 120° C. and then was calcined for 3 hours at 500° C.

Part B

Chromium oxide in an amount equivalent to 2 weight % elemental chromium was deposited on the support of Part A employing the technique described in Example 13. The catalyst was activated by heating for 5 hours at 500° C. in a fluidized bed.

Part C

When employed to polymerize ethylene, the catalyst of Part B produced polymer at a rate of 145 grams of polymer per gram of catalyst per hour. The polymer had a HLMI/MI ratio of 1600. The S value (subsequently defined) of the polymer was 0.676.

Part D

The aluminum phosphate set forth in Example 1 was impregnated with 2 weight % chromium employing the technique described in Example 13. When employed to polymerize ethylene by the method previously described, polymer was produced at a rate of 310 grams of polymer per gram of catalyst per hour.

EXAMPLE 18

Several carriers having varying Al:P atomic ratios were prepared as described in Example 11. Chromic anhydride was added to the slurries to provide 2 wt % chromium in the finished catalyst. The catalysts were dried and calcined for 5 hours at 500° C. The dried catalysts were ground and the fractions having a particle size range of 43 to 149 microns were activated for 5 hours at 500° C. in a fluidized bed.

Ethylene polymers were prepared with each of the catalysts. The polymers' melt viscosities at 190° C., certain calculated HLMI/MI ratios, and rates of polymerization are shown in Table IV. The melt viscosities were determined as described in Example 20.

Table IV

| Al/P Ratio In Carrier | Polymerization Rate(1) | Melt Viscosity @ 190° C.(2) | HLMI/MI Ratio |
|---|---|---|---|
| 1.2:1.0 | 300 | 86 | 900 |
| 1.5:1.0 | 360 | 84 | 730 |
| 2.0:1.0 | 390 | 129 | 2500 |
| 3.0:1.0 | 350 | 172 | 480 |

Table IV-continued

| Al/P Ratio In Carrier | Polymerization Rate(1) | Melt Viscosity @ 190° C.(2) | HLMI/MI Ratio |
|---|---|---|---|
| 4.0:1.0 | 228 | 204 | 821 |
| 9.0:1.0 | 10 | (3) | (3) |

(1)Grams of polymer/gram of catalyst/hour
(2)Poises × $10^3$ @ 10 sec.$^{-1}$ shear rate
(3)Too little polymer was recovered to obtain rheological data.

The above data clearly indicate that the Al/P ratio of the support has an effect on the melt viscosity of the polymer. Increasing the Al/P ratio increases the melt viscosity and molecular weight of the polymer. The Al/P ratio also has an effect on polymerization rates and should be kept below 9.0:1.0.

EXAMPLE 19

Ethylene polymer was produced by a Particle Form Process by a continuous process employing a catalyst of the invention. The catalyst was prepared by depositing 2.2 weight % chromium on an aluminum-phosphorus precipitate prepared by a process as illustrated in Example 2. The chromium was deposited upon the support as chromium oxide by a process as illustrated in Example 12. The catalyst was activated by being heated for 15 hours at about 890° C. in a fluidizied bed of dry air.

A continuous polymerization was carried out in a pressurized, circulating loop reactor having a volume of 55 gallons. The reactor was fitted with inlets for isobutane, ethylene, and catalyst slurry. The reactor also was fitted with a discharge outlet. The reactor was initially charged with isobutane containing a small percentage of ethylene. A catalyst charge of about 0.3 gram was added to the reactor to initiate polymerization. The reactor was heated to a temperature of 105° C. and, under these conditions, the reactor pressure was about 540–550 psig.

The polymerization began without an induction period. Throughout the duration of the run, isobutane was continuously charged to the reactor at a rate of 53 pounds per hour and ethylene was charged to the reactor at a rate of 20 pounds per hour. Fresh catalyst slurry was charged to the reactor at a rate sufficient to maintain the temperature constant. This required an average of 32 injections of 0.3 grams of catalyst per hour. Product slurry consisting of ethylene polymer, isobutane, unpolymerized ethylene and catalyst was continuously discharged from the reactor at a rate of about 75 pounds per hour.

Under the above-described operating conditions, the average residence time of ethylene in the reactor was about 3.5 hours. The product slurry recovered from the reactor had a bulk density of about 32 pounds per cubic foot. The reaction was carried out over a period of 24 hours and ethylene polymer was produced at a rate of just over 20 pounds per hour. The polymer had a melt index (ASTM 1238-70 Condition E) of 0.03.

Ethylene polymers produced employing the catalysts of the present invention differ in important respects from ethylene polymers of identical melt index (or identical molecular weight) produced by alternate prior art polymerization processes, e.g., ethylene polymers prepared by a Particle Form Processes with a commercial chromia catalyst supported on silica. While such ethylene polymers may have identical melt indexes, the ethylene polymers have substantially different processing characteristics. Specifically, with the ethylene polymers made with the catalysts of the invention, the change of melt viscosity with applied shear is much greater than is the case with the prior art ethylene polymers. One significance of this fact is that ethylene polymers of very low melt index made with the catalysts of the invention can be extruded in conventional extruders by carrying out the extrusion at high applied shear rates. By contrast, prior art ethylene polymers of comparable low melt indexes simply cannot be extruded in conventional extruders. The difficulties in extruding the prior art very high molecular weight ethylene polymers are discussed by L. V. Cancio and R. S. Joyner in their paper GAINS ARE MADE IN EXTRUDING HMW PE POWDERS, *Plastics Technology*, February 1975, pp. 40–44.

EXAMPLE 20

The melt flow characteristics of two resins were determined at 190° C. in a rheometer. The apparent melt viscosities of the resins at varying apparent shear rates were determined and are shown in Table V.

Table V

| Polymer | Apparent Melt Viscosity(1) | Apparent Shear Rate(2) |
|---|---|---|
| Prior Art | 164 | 1.5 |
| Resin | 112 | 3.0 |
|  | 70 | 7.4 |
|  | 48 | 14.8 |
|  | 33 | 29.6 |
|  | 20 | 74.1 |
|  | 13 | 148 |
| Resin of |  |  |
| Invention | 181 | 3.0 |
|  | 98 | 7.4 |
|  | 63 | 14.8 |
|  | 38 | 29.6 |
|  | 22 | 74.1 |
|  | 14 | 148 |

(1)Poise × $10^3$ @ 190° C.
(2)Sec.$^{-1}$

The ethylene polymer of the invention was prepared by the standard procedure previously described. The support for the catalyst was prepared as described in Example 12 and had an Al:P atomic ratio of 2:1. One percent chromium was deposited on the carrier which then was calcined at 500° C. The catalyst was activated with dry air in a fluidized bed for 14 hours at 760° C. A commercially available prior art linear ethylene polymer was employed for comparison purposes.

The approximate normal load melt index (MI) (ASTM 1238-70 Condition E) and the approximate high load melt index (HLMI) (ASTM 1238-70 Condition F) of the two polymers can be calculated from the data of Table V. The HLMI/MI ratio for the prior art polymer is approximately 130. The corresponding ratio for the polymer made with the catalyst of the present invention was approximately 760. The higher HLMI/MI ratio of the ethylene polymer of the invention indicates that the catalysts of the invention provide ethylene polymers which have an unusually broad molecular weight distribution. Such polymers inherently have better processing characteristics.

The data of Table V are plotted in FIG. 4 on log - log paper to show the change in apparent viscosity (in poises) with apparent shear rate (in reciprocal seconds). The curves for both resins are approximately straight lines, but it will be noted that the curve for the ethylene polymer of the invention has a much steeper slope. The curve for the ethylene polymer of the invention has a slope of −0.65 (measured at 10 sec. $^{-1}$), whereas the curve for the prior art ethylene polymer has a slope of −0.54. These negative slopes will be characterized as S values in the subsequent discussion.

Curves of the type shown in FIG. 4 graphically illustrate the shear thinning or pseudoplastic flow of ethylene polymers. When curves of this type are prepared for two ethylene polymers having identical or similar melt indexes, the polymer having the curve with the greater slope will exhibit greater shear thinning, or pseudoplastic flow, and will flow more readily at high applied shear rates.

For purposes of the present specification, we will designate the slope of such curves as a "slope parameter," which we will represent by S, and which is the value of the negative slope of a plot of the natural logarithm of the polymer's apparent melt viscosity versus the natural logarithm of the apparent shear rate; such slope being measured at 10 sec.$^{-1}$ at 190° C. A comparison of such S values for the ethylene polymers of the present invention with the S values of prior art linear ethylene polymers, both values being determined on polymers of similar melt index, always demonstrates that the ethylene polymers of the present invention have larger S values.

For any family of ethylene polymers, the absolute value of S is a function of the polymer's melt viscosity level. The change of S with melt viscosity level can be characterized by use of a "viscosity reference parameter" which will be represented by $A_o$ and which is the natural logarithm of the polymer's apparent melt viscosity at 1 sec.$^{-1}$.

Linear ethylene polymers heretofore available to the art and prepared with chromia catalysts supported on silica have a relationship between their weight average molecular weight and their number average molecular weight such that the ratio $\overline{M}_w/\overline{M}_n$ is approximately 10. For such prior art ethylene polymers, the approximate relationship between S and $A_o$ is defined by Formula 1:

$$S = 0.0813 A_o - 0.47 \quad (1)$$

The best curve for the relationship between S and $A_o$ for the ethylene polymers of the present invention for S values within a range of about 0.61 to about 0.90 and $A_o$ values within a range of about 12.3 to about 14.25, is defined by Formula 2:

$$S = 0.106 A_o - 0.71 \pm 0.02.$$

Typical experimental S and $A_o$ values for several ethylene polymers of the invention having $A_o$ values from about 12.5 to 14.2 are set forth in Table VI.

Table VI

| Polymer Identification | $A_o$ | S |
|---|---|---|
| A | 12.53 | 0.68 |
| B | 12.65 | 0.65 |
| C | 12.80 | 0.66 |
| D | 13.07 | 0.67 |
| E | 13.33 | 0.71 |
| F | 13.52 | 0.73 |
| G | 13.78 | 0.75 |
| H | 14.20 | 0.79 |

Where experimentally determined S values depart from Formula 2, the experimentally determined values are nearly always larger than the predicted values. Such departures from Formula 2 occur most frequently when the $A_o$ values are below about 13.5.

A formula for the relationship between S and $A_o$ for the ethylene polymers of the invention; valid for S values within a range of about 0.61 to about 0.90 and $A_o$ values within a range of about 12.0 to about 14.5, which includes all presently determined experimental value is defined by Formula 3:

$$S \geq 0.0830 A_o - 0.442$$

FIG. 5 sets forth a graphic representation of Formula 1 and Formula 2. It will be observed that the two curves are substantially parallel to each other, with the curve for Formula 2 lying to the right of the curve for Formula 1. The relationship between the two curves indicates that, when an ethylene polymer of the invention and a prior art ethylene polymer have identical $A_o$ values, the ethylene polymer of the invention always will have a significantly higher S value. FIG. 5 also sets forth the limiting value of Formula 3 when S is defined by the formula:

$$S = 0.83 A_o - 0.442$$

The area defined by the lines joining A, B, C, D, and E includes the S and $A_o$ values for the preferred ethylene polymers of the invention. To the best of the applicants' knowledge, no ethylene polymer reported in the prior art, or tested by them, has S and $A_o$ values lying within this area of FIG. 5.

The importance of the S values of ethylene polymers results from the fact that the physical properties of most articles fabricated from ethylene polymers are improved as the molecular weight of the polymer is increased. However, the melt viscosity of ethylene polymers also increases with molecular weight. The melt fabrication of ethylene polymers becomes increasingly more difficult as the polymer's melt viscosity increases. Polymer fabrication apparatus presently available cannot process prior art ethylene polymers of very high molecular weight for reasons discussed below.

When an attempt is made to extrude a prior art linear ethylene polymer having an $A_o$ value of the order of 12.0 or higher, it is necessary to extrude the polymer at a minimum shear rate of about 300 sec.$^{-1}$ to obtain extrusion rates approaching the design output rate of the extruder. At these shear rates, the shear stress on the polymer at the die orifice exceeds about $3 \times 10^6$ dynes/cm$^2$. At these levels of shear stress, the quality of the extruded article is quite poor and its physical properties are poor. This results from a phenomenon known in the art as melt fracture, or melt instability.

By reason of the relationship existing between their S values and $A_o$ values, high molecular weight ethylene polymers of this invention can be more readily fabricated with conventional fabricating apparatus to provide polymer articles of excellent quality and physical properties. The ethylene polymers of the invention having the optimum properties desired by the art have the following characteristics:

(1) Melt flow properties conforming to the S - $A_o$ relationship of formula 3 previously set forth, (2) An $A_o$ value in the range of about 12.0 to about 14.5, (3) An S value in the range of about 0.61 to about 0.90.

Especially preferred ethylene polymers of the invention are those having an $A_o$ value in the range of about 12.25 to 14.0.

By reason of their high melt flow shear ratios and the considerations discussed above, the ethylene polymers of the invention can be fabricated into articles of manufacture having significantly superior physical properties as compared to corresponding articles fabricated from linear ethylene polymers heretofore available to the art. These differences are particularly noticeable in the manufacture of film from ethylene polymers having very low melt indexes.

EXAMPLE 21

Blown film of 2.5 mil gauge was prepared from the ethylene polymer of Example 19. The film was extruded through a 1¾ inch extruder employing a melt temperature of about 295° C., a pressure of about 5,600 psi, and a screw speed of 60 rpm. A blowup ratio of 3.8:1.0 was employed.

As a control, 2.5 mil gauge film was prepared from a prior art ethylene polymer prepared by a Particle Form Process employing a chromia on silica catalyst. This polymer had a melt index (ASTM 1238-70, Condition E), of 0.6. The extrusion conditions employed were those previously established as being optimum for this polymer.

Several physical properties of the two films were measured and are set forth in Table VII. In the table MD signifies a measurement in the machine direction, while TD signifies a measurement in the transverse direction.

Table VII

| Property | Ethylene Polymer | |
|---|---|---|
| | Present Invention | Prior Art |
| Film Density, g/Cm³(1) | 0.954 | 0.959 |
| Crystallinity, %(2) | 78.6 | 70 |
| Tensile at yield, psi, MD(3) | 3870 | 4400 |
| Tensile at yield, psi, TD(3) | 4125 | 3600 |
| Elongation at break, %, MD(4) | 475 | 200 |
| Elongation at break, %, TD(4) | 500 | 2 |
| Elmendorf Tear, g/mil, MD(5) | 54 | 18 |
| Elmendorf Tear, g/mil, TD(5) | 49 | 39 |
| Dart Impact at 26", g/mil(6) | 38 | 25 |

(1)ASTM D 1509
(2)Determined by Differential Thermal Analysis
(3)ASTM D882
(4)ASTM D882
(5)ASTM D1922
(6)ASTM D1709

The above data demonstrate that the film prepared from the ethylene polymer of the invention is remarkably superior to its prior art counterpart. It will be specifically noted that its measured properties in the machine and transverse directions are quite close to each other. This is a highly desirable feature in a film. The film of the invention is much superior to its prior art counterpart with respect to elongation at break, Elmendorf tear, and dart impact, all of which are important film properties.

Blown film prepared from ethylene polymers of the invention has a significantly lower gel content than blown film prepared from linear ethylene polymers of the prior art. Moreover, what few gels are occasionally observed are smaller in size than the gels present in the prior art film.

The gel content of blown film is determined by counting the gels in 240 in.² of the film and measuring the diameter of the gels observed. The film of the invention prepared in Example 21 contained fewer than 10 gels. Only one of these gels had a diameter between 1/64" and 1/32", with the remaining gels having diameters smaller than 1/64". The gel content of this film was actually lower than that observed with film prepared from good quality low density polyethylene resins. This observation is quite significant as it is recognized in the art that film prepared from low density polyethylene resins usually is substantially freer of gels than film prepared from linear ethylene polymers.

For comparison purposes, film prepared from linear ethylene polymer prepared by a Particle Form Process employing a chromia catalyst supported on silica typically will have well in excess of 40 gels per 240 in². Typically five of these gels will have diameters of 1/32" or more, 15 of these gels will have diameters between 1/64" and 1/32", with the balance having diameters smaller than 1/64".

Ethylene polymers of the invention having relatively low molecular weights and relatively high melt indexes of the order of 0.5 or more (ASTM 1238-70, Condition E), by reason of their high S values, have extremely low apparent melt viscosities under the apparent shear rates employed in commercial extruders. As compared with prior art linear ethylene polymers of these melt indexes, the ethylene polymers of the invention can be extruded at significantly higher rates and with lower extruder power consumption. These factors significantly reduce the cost of preparing such extruded products.

EXAMPLE 22

A series of continuous polymerization runs was made in the loop reactor described in Example 19. Certain parameters were varied to determine their effect upon the polymerization and the properties of the ethylene polymers being produced.

The catalyst employed was prepared as described in Example 12 with the Al:P ratio in the support being 2:1. Chromium oxide was added to the wet slurry in an amount corresponding to 2 weight % chromium metal based on the total solids. The catalyst was spray dried and calcined for 12 hours at 260° C. The catalyst was activated by being heated for 15 hours in dry air at 890° C. in a fluidized bed. The activated catalyst was stored under dry nitrogen until used.

As described in Example 19, the reactor was initially charged with isobutane containing a small quantity of ethylene. A catalyst charge of about 0.3 gram was added to the reactor to initiate polymerization. The reactor was heated to a selected temperature in the range of 220°–228° F. (104°–109° C.) and, under these conditions, the reactor pressure was about 540–560 psig.

Throughout the duration of each run, isobutane was continuously charged to the reactor at a fixed rate. Ethylene was charged to the reactor at a rate sufficient to maintain a preselected weight % of ethylene in the off gas being removed from the reactor. Fresh catalyst slurry was charged to the reactor at a rate sufficient to maintain the temperature constant. This required an average of 32 injections of about 0.3 gram of catalyst per hour. Product slurry consisting of ethylene polymer, isobutane, unpolymerized ethylene and catalyst was continuously discharged from the reactor at a rate of about 75 pounds per hour.

The parameters varied in the several runs were:
1. Polymerization temperature,
2. Inclusion of varying quantities of propylene and hexene in the reactor as comonomers, 3. Rate of isobutane addition which varied the polymer solids in the reactor, and
4. Inclusion of hydrogen.

The polymerization data and selected polymer properties are set forth in Table VIII.

TABLE VIII

| RUN IDENTIFICATION | 22-1 | 22-3 | 22-4 | 22-5 | 22-6 | 22-7 | 22-8 |
|---|---|---|---|---|---|---|---|
| Polymerization Conditions | | | | | | | |
| Reactor Temp., °F. | 220 | 225 | 225 | 228 | 228 | 228 | 228 |
| Reactor Solids, wt % | 24.8 | 24 | 23.9 | 23.1 | 24.0 | 26.0 | 20 |
| Polymer Production, lbs/hr | 20 | 19 | 20 | 17 | 17 | 19 | 19 |
| Catalyst Productivity | | | | | | | |
| lbs polymer/lbs catalyst | 1220 | 595 | 900 | 640 | 680 | 848 | 683 |
| Reactor Charge | | | | | | | |
| Isobutane, lbs/hr | 55 | 56 | 54 | 63 | 63 | 52 | 70 |
| Ethylene, wt % of Off Gas(1) | 3.5 | 4.1 | 3.5 | 3.9 | 3.6 | 3.3 | 3.2 |
| Comonomer Employed(2) | — | — | — | — | — | — | — |
| Comonomer Charged(3) | — | — | — | — | — | — | — |
| Hydrogen Charged, mol % of Off Gas(4) | — | 0.1 | 0.5 | — | 0.45 | 0.47 | 0.41 |
| Polymer Properties | | | | | | | |
| Bulk Density, lbs/ft$^3$ | 33.2 | 35.6 | 33 | 36.1 | 32.8 | 35.6 | 36.2 |
| Melt Index(5) | 0.051 | 0.61 | 0.22 | 0.027 | 0.48 | 0.47 | — |
| HLMI/MI Ratio(6) | 243 | 112 | 170 | 331 | 150 | 137 | — |
| Density, g/ml | 0.958 | 0.961 | 0.959 | 0.959 | 0.960 | 0.959 | 0.960 |
| Crystallinity, % | 83.9 | 82.0 | 78.6 | 70.1 | — | 80.4 | — |
| mp, °C. | 135 | 132 | 133 | 136 | — | 135 | 131 |
| ESC(7) | 31 | 30 | 21 | 43 | 21 | 23 | 24 |
| Tensile at Yield, psi | 4040 | 4240 | 4095 | 4160 | 4160 | 4240 | 4270 |
| Tensile at Break, psi | 3540 | 2410 | 2585 | 2760 | 2530 | 2684 | 2400 |
| % Elongation at Break | 640 | — | — | 520 | — | 440 | — |

| RUN IDENTIFICATION | 22-9 | 22-10 | 22-11 | 22-12 | 22-13 | 22-14 | 22-15 | 22-16 | 22-17 |
|---|---|---|---|---|---|---|---|---|---|
| Polymerization Conditions | | | | | | | | | |
| Reactor Temp., °F. | 228 | 228 | 228 | 228 | 215 | 215 | 215 | 215 | 225 |
| Reactor Solids, wt % | 21.5 | 31.5 | 30.5 | 20.5 | 19.2 | 21.0 | 19.9 | 19.5 | 22.7 |
| Polymer Production, lbs/hr | 17.5 | 18 | 19 | 18 | 16 | 17 | 17 | — | 15 |
| Catalyst Productivity | | | | | | | | | |
| lbs polymer/lbs catalyst | 625 | 952 | 900 | 714 | 553 | 476 | 389 | 229 | 478 |
| Reactor Charge | | | | | | | | | |
| Isobutane, lbs/hr | 35.6 | 34.6 | 35.9 | 35.5 | 34.1 | 32.9 | 33.7 | 35.8 | 37.6 |
| Ethylene, wt % of Off Gas(1) | 3.5 | 3.4 | 3.4 | 3.5 | 2.9 | 3.8 | 4.2 | 4.2 | 3.6 |
| Comonomer Employed(2) | — | — | — | — | C-6 | C-6 | C-6 | C-6 | — |
| Comonomer Charged(3) | — | — | — | — | 0.25 | 0.42 | 0.49 | 0.74 | — |
| Hydrogen Charged, mol % of Off Gas(4) | 0.45 | 0.53 | 0.25 | 0.20 | — | — | 0.45 | — | — |
| Polymer Properties | | | | | | | | | |
| Bulk Density, lbs/ft$^3$ | 35.6 | 34.6 | 35.9 | 35.5 | 34.1 | 32.9 | 33.7 | 35.8 | 37.6 |
| Melt Index(5) | 0.52 | 0.53 | 0.36 | 0.38 | 0.014 | 0.034 | 1.07 | 0.10 | 0.14 |
| HLMI/MI Ratio(6) | 137 | 126 | 120 | 150 | 490 | 395 | 84.5 | 245 | 345 |
| Density, g/ml | 0.959 | 0.959 | 0.960 | 0.960 | 0.954 | 0.950 | 0.951 | 0.949 | 0.960 |
| Crystallinity, % | 90.0 | 74.2 | 77.3 | 68.0 | 77.2 | 57.9 | 66.5 | 57.4 | 75.4 |
| mp, °C. | 136 | 132 | 132 | 135 | 135 | 132 | 128 | 130 | 133 |
| ESC(7) | 21 | 18 | 22 | 26 | 285 | >360 | 103 | >360 | 24 |
| Tensile at Yield, psi | 3978 | 4360 | 4230 | 4117 | 3800 | 3360 | 3740 | 3240 | 3960 |
| Tensile at Break, psi | 2255 | 2655 | 2810 | 2496 | 3420 | 3270 | 2510 | 3080 | 2380 |
| % Elongation at Break | — | — | — | — | 570 | 550 | 410 | 540 | — |

| RUN IDENTIFICATION | 22-18 | 22-19 | 22-20 | 22-21 | 22-22 | 22-23 | 22-24 | 22-25 | 22-26 |
|---|---|---|---|---|---|---|---|---|---|
| Polymerization Conditions | | | | | | | | | |
| Reactor Temp., °F. | 228 | 220 | 220 | 220 | 225 | 228 | 228 | 228 | 220 |
| Reactor Solids, wt % | 29 | 22.3 | 26.5 | 17 | 24.9 | 30.2 | 31 | 29.5 | 21.5 |
| Polymer Production, lbs/hr | 15 | 18 | 17 | 17 | 19 | 21 | 18 | 17.9 | 16.3 |
| Catalyst Productivity | | | | | | | | | |
| lbs polymer/lbs catalyst | 390 | 769 | 881 | 731 | 1102 | 1010 | 1194 | 1562 | 961 |
| Reactor Charge | | | | | | | | | |
| Isobutane, lbs/hr | 45 | 58 | 47 | 75 | 56 | 48 | 40 | 40 | 63 |
| Ethylene, wt % of Off Gas(1) | 3.5 | — | — | — | — | — | — | — | — |
| Comonomer Employed(2) | — | — | — | — | — | — | — | — | — |
| Comonomer Charged(3) | — | — | — | — | — | — | — | — | — |
| Hydrogen Charged, mol % of Off Gas(4) | — | 1.5 | 1.63 | — | — | — | — | — | — |
| Polymer Properties | | | | | | | | | |
| Bulk Density, lbs/ft$^3$ | — | 36.3 | 35.5 | 31.2 | 33.6 | 36.6 | 34.6 | 35.6 | 33.7 |
| Melt Index(5) | 0.30 | 0.72 | 0.46 | 0.003 | 0.015 | 0.12 | 0.051 | 0.33 | 0.00 |
| HLMI/MI Ratio(6) | 170 | 101 | 96.0 | 924 | 434 | 344 | 391 | 144 | 1299 |
| Density, g/ml | 0.960 | 0.950 | 0.954 | 0.957 | 0.958 | 0.960 | 0.958 | 0.959 | 0.957 |
| Crystallinity, % | — | 76.4 | 63.6 | 78.4 | 71.0 | 74.6 | 75.3 | 74.1 | 69.7 |
| mp, °C. | — | 132 | 131 | 136 | 136 | 133 | 133 | 133 | 133 |
| ESC(7) | 57 | 11.0 | 6.1 | 19.5 | 13.0 | 20.5 | 9.0 | 25 | 32 |
| Tensile at Yield, psi | 3940 | 3527 | 3512 | 4176 | 4231 | 3950 | 4400 | 4220 | 4050 |
| Tensile at Break, psi | 2670 | 2073 | 2104 | 3257 | 2977 | 2610 | 3300 | 2550 | 3140 |

TABLE VIII-continued

| % Elongation at Break | 335 | — | 270 | 550 | 600 | 650 | 625 | — | 540 |
| --- | --- | --- | --- | --- | --- | --- | --- | --- | --- |
| RUN IDENTIFICATION | 22-27 | 22-28 | | | | | | | |
| polymerization Conditions | | | | | | | | | |
| Reactor Temp., °F. | 228 | 215 | | | | | | | |
| Reactor Solids, wt % | 23.1 | 28.7 | | | | | | | |
| Polymer Production, lbs/hr | 9 | 19 | | | | | | | |
| Catalyst Productivity | | | | | | | | | |
| lbs polymer/lbs catalyst | 151 | 270 | | | | | | | |
| Reactor Charge | | | | | | | | | |
| Isobutane, lbs/hr | 27 | 47 | | | | | | | |
| Ethylene, wt % of Off Gas(1) | 0.95 | 1.55 | | | | | | | |
| Comonomer Employed(2) | — | C-3 | | | | | | | |
| Comonomer Charged(3) | — | 372 | | | | | | | |
| Hydrogen Charged, mol % of Off Gas(4) | 1.66 | 1.46 | | | | | | | |
| Polymer Properties | | | | | | | | | |
| Bulk Density, lbs/ft$^3$ | 34.4 | 34.6 | | | | | | | |
| Melt Index(5) | 9.89 | 2.20 | | | | | | | |
| HLMI/MI Ratio(6) | 55 | 71 | | | | | | | |
| Density, g/ml | 0.962 | 0.951 | | | | | | | |
| Crystallinity, % | 67.0 | 60.9 | | | | | | | |
| mp, °C. | 133 | 126 | | | | | | | |
| ESC(7) | 0 | 2.2 | | | | | | | |
| Tensile at Yield, psi | 4060 | 3540 | | | | | | | |
| Tensile at Break, psi | 4060 | 2800 | | | | | | | |
| % Elongation at Break | — | — | | | | | | | |

FOOTNOTES TO TABLE VIII
(1)Ethylene was charged at a rate sufficient to maintain this weight % in the off gas discharged from the reactor.
(2)C-3 represents propylene and C-6 represents hexene.
(3)Propylene was charged at a rate sufficient to maintain this weight % in the off gas discharged from the reactor. Hexene was charged at the indicated rate in ml/hr.
(4)Hydrogen was charged at a rate to maintain this mol % in the off gas discharged from the reactor.
(5)Normal load determined by ASTM 1237-70, Condition E.
(6)Ratio of High Load Melt Index (determined under Condition F) divided by Normal Load Melt Index (determined under Condition E).
(7)Environmental Stress Cracking, hours to 50% failures.

Polymerization temperature over the range studied has only a small effect on polymer properties. Specifically the normal load melt index, determined by ASTM 1238-70, Condition E, increases slightly with polymerization temperature. See the data for Runs 22-4 and 22-6.

The level of polymer solids in the range of about 20-30 weight % has no significant effect upon polymer properties. Increasing the polymer solids, however, does increase the catalyst productivity. See the data for Runs 22-5 through 22-12. Polymerization at a solids level of about 17 weight %, however, appeared to have a significant effect on polymer properties. Specifically, the tensile at break and elongation at break values were quite high. In addition, the normal load melt index was quite low, and the HLMI/MI ratio was large. See the data for Run 22-11. Blown film prepared from this resin should have excellent physical properties.

The limited data obtained with propylene and hexene copolymers indicate that the density of the resulting polymer is reduced. The hexene copolymers made in the absence of hydrogen had excellent stress crack resistance, tensile strength and elongation at break. See the data of Runs 22-13, 22-14, and 22-16. The resins have an excellent combination of properties for use in the manufacture of extruded pipe. The HLMI/MI ratios indicated that the polymers, despite their high molecular weight and low melt index, can be readily extruded at commercially acceptable rates.

Hydrogen has two observable effects upon the polymerization reaction. First, it increases the melt index of the polymer being produced. Quantitatively, the effect is much more pronounced than the effect of hydrogen on ethylene polymerizations carried out in the presence of a catalyst consisting of chromia supported on silica. Second, hydrogen lowers the HLMI/MI ratio of the polymers being produced.

In obtaining the tensile and elongation data reported in Table VIII, it was noted that the polymers prepared in the absence of hydrogen behave quite differently from prior art high density ethylene polymers when drawn to the breaking point to measure elongation at break. The difference is seen by reference to FIG. 6.

The four left hand drawings in FIG. 6 illustrate the manner in which a standard "dog bone" specimen of a prior art high density ethylene polymer deforms when drawn from its ambient rest state to its break point. The top figure shown is a dog bone 10 which has a narrow center section 11 with two marks 12 thereon. The second figure from the top shows a narrow section 14 of decreased cross sectional area 14 which develops between marks 12 as the sample is first drawn. As noted in the third figure from the top, as the sample is further drawn essentially all of the elongation takes place between shoulders 13 and section 14 becomes progressively narrower in cross section. Finally, as section 14 is drawn further breakage occurs. The measured distance between marks 12 at break is used to calculate the elongation at break.

The four right hand drawings in FIG. 6 illustrate the manner in which a "dog bone" specimen of a polymer of the invention, e.g., the polymer of Run 22-21, deforms when drawn from its ambient rest state to its break point. In FIG. 6 all parts bear a number 100 units higher than corresponding parts of the prior art specimen. Referring to the second figure from the top, the sample initially deforms in essentially the same manner as the prior art specimen to form a narrow section 114 of decreased cross sectional area between marks 112. Unlike the prior art specimen, however, the further elongation is not restricted to the material between shoulders 113 as shown in the second figure from the top. Instead, the shoulders 113 move toward the ends of the specimen and beyond the marks 112 as illustrated in the third and fourth figures from the top.

The above facts and observations are of principal significance in further demonstrating that the polymers of the invention differ in important respects from prior art high density ethylene polymers. In Table VIII the reported values of elongation at break were determined by measuring the distance between marks 112 at the break point. The actual elongation was considerably greater.

The data of the examples demonstrate that the process of the invention has great versatility. By proper control of the process parameters, it is possible to prepare ethylene polymers having:

(1) a wide variation in molecular weight and melt index,
(2) a wide variation in HLMI/MI ratios,
(3) a wide variation in melt flow shear ratios (measured by S values),
(4) a wide variation in resistance to environmental stress-cracking, and
(5) a reasonable variation in density.

We claim:

1. A process for preparing an olefin polymerization catalyst which consists essentially of depositing a chromium compound upon an amorphous inorganic carrier containing aluminum and phosphorus moieties; said carrier having been prepared by neutralizing an acidic aqueous solution containing $Al^{+++}$ cations and $PO_4^{---}$ anions in an aqueous medium at a pH in the range of about 4.0–11.0 to form a solid precipitate containing aluminum and phosphorus moieties, and recovering said pecipitate; said acidic solution containing aluminum and phosphorus in an atomic ratio in the range of about 5:1 to 1:1.

2. The process of claim 1 in which the catalyst is activated by being heated to a temperature in the range of about 350° C. to 950° C.

3. The process of claim 1 in which the inorganic carrier is prepared by feeding the aqueous solution containing $Al^{+++}$ cations and $PO_4^{---}$ anions to an aqueous medium with stirring while simultaneously feeding to such medium an alkaline solution.

4. The process of claim 1 which includes the steps of:

(a) preparing an aqueous slurry of the inorganic carrier by the method of claim 3,
(b) admixing an inorganic chromium compound with the slurry of (a) to provide about 0.1–4.0% by weight chromium based on the total solids,
(c) spray drying the slurry of (b), and
(d) activating the dry catalyst of (c) by heating to a temperature of about 350–950° C.

5. The process of claim 1 which includes the steps of (a) preparing an aqueous solution containing chromium ions in addition to $Al^{+++}$ and $PO_4^{---}$ ions,
(b) precipitating an inorganic material containing aluminum, phosphorous and chromium moieties from the aqueous solution of (a) by the method of claim 3,
(c) drying the precipitate of (b), and
(d) activating the dry catalyst of (c) by heating to a temperature of about 350°–950° C.;

the chromium added in step (a) being sufficient to constitute about 0.1–4.0% weight of the precipitate of step (b).

6. The process of claim 1 in which the support is an amorphous precipitate containing aluminum and phosphorus moieties in an atomic ratio of about 3.5:1 to about 1.2:1.

7. An olefin polymerization catalyst prepared by the method of claim 1.

8. The process of claim 3 in which the pH is maintained in a range of about 6.0 to 10.0.

9. A process for preparing an olefin polymerization catalyst which consists essentially of:

(a) preparing an amorphous precipitate of an inorganic carrier by the method of claim 3,
(b) calcining the precipitate of (a), and
(c) impregnating the calcined precipiate of (b) with an organochromium compound.

10. The process of claim 9 in which the catalyst is activated by being heated to a temperature in the range of about 350° C. to about 950° C.

11. An olefin polymerization catalyst prepared by the method of claim 3.

12. An olefin polymerization catalyst prepared by the method of claim 5.

13. An olefin polymerization catalyst prepared by the method of claim 4.

14. An olefin polymerization catalyst prepared by the method of claim 6.

* * * * *